Oct. 31, 1967
M. V. DE JEAN
3,349,478
METHOD OF MANUFACTURING A ROTOR ASSEMBLY
Original Filed Nov. 24, 1961
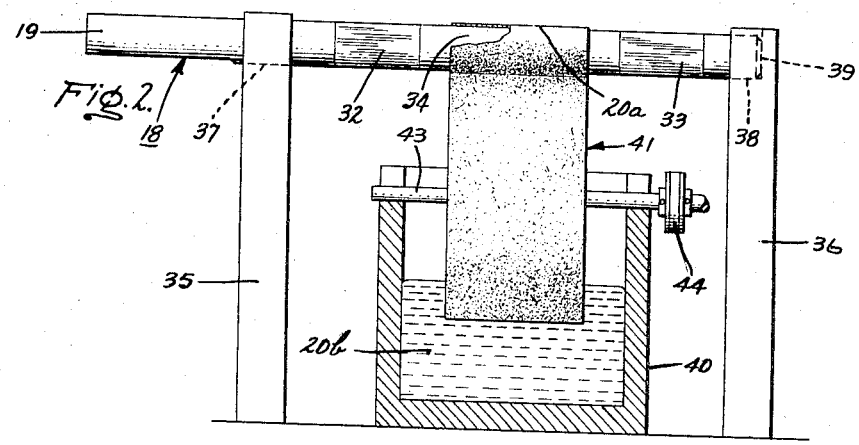
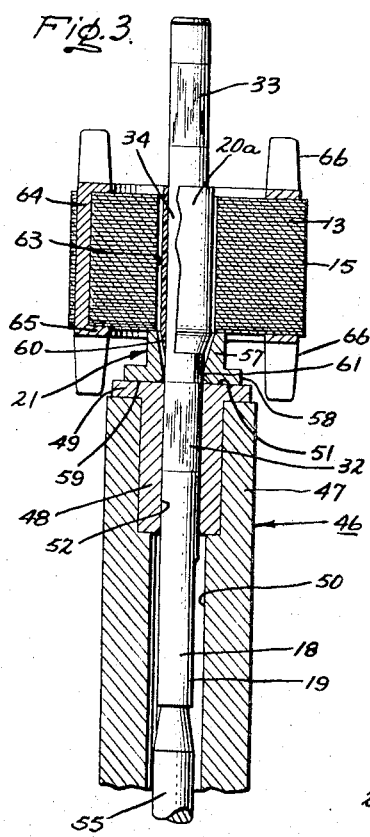
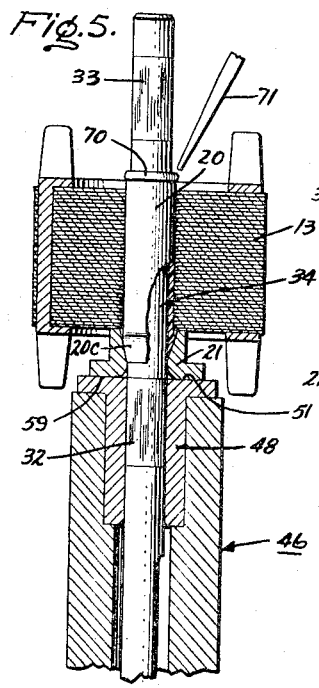
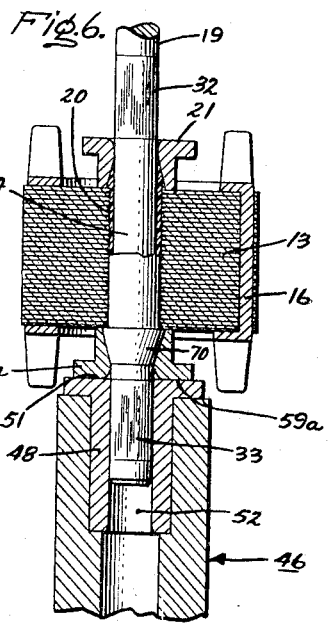
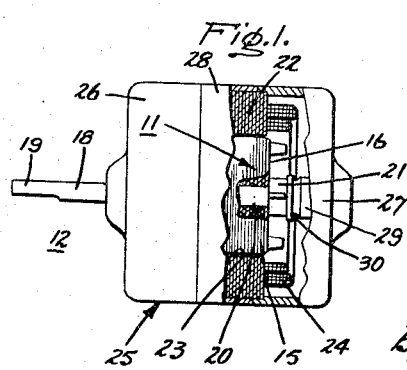
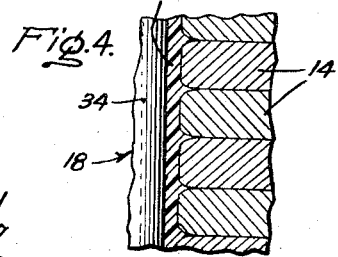
Inventor:
Milton V. De Jean,
by John M. Stoudt
Attorney.

United States Patent Office 3,349,478
Patented Oct. 31, 1967

3,349,478
METHOD OF MANUFACTURING A ROTOR ASSEMBLY
Milton V. De Jean, Pitcairn, Pa., assignor to General Electric Company, a corporation of New York
Continuation of abandoned application Ser. No. 154,705, Nov. 24, 1961. This application May 19, 1965, Ser. No. 463,442
3 Claims. (Cl. 29—598)

The present application is a continuation of my co-pending application Ser. No. 154,705 filed Nov. 24, 1961, and now abandoned. This invention relates genarally to dynamoelectric machines and more particularly to a laminated rotor assembly and to an improved method of fabricating the same.

Dynamoelectric machines, such as fractional and small horsepower induction motors, commonly incorporate a rotor assembly in which the rotor core includes a predetermined number of identical laminations permanently secured in superposed relation on a shaft extending centrally through the core. Conventionally these laminations are individually provided with a plurality of angularly spaced apart slots, axially aligned to accommodate the rotor windings, for example solid cast conductors in the case of the well known squirrel-cage type rotor. On either side of the rotor core, the shaft is usually provided with a smooth journal surface adapted to be rotatably received in suitable shaft carrying bearings mounted in the motor frame. Ideally, to effect optimum performance and long life operation when the assembly is in the motor the journal surfaces of the shaft should have a smooth finish and be properly aligned, and both the rotor winding conductors as well as the outer peripheral surface of the rotor core should be in true concentricity with the shaft itself.

In actual practice, these extremely desirable structural relationships of component parts of the rotor assembly are difficult to attain with any degree of consistency and regularity in the mass production of motors and at the same time maintain economy in the fabrication of the rotor assembly.

For instance, typical of the suggested approaches prior to the present invention is the one in which a stack of identical laminations, stamped out of magnetic stock sheet material such as steel, are temporarily held together with suitable inter-laminar core insulation therebetween and with the winding slots arranged in a skewed manner. A metallic electrical conductive squirrel-cage winding structure is then cast integrally with the laminations and cooled to set the cast metal. After the die casing operation, the core may be annealed and shrunk-fit onto the shaft which is usually in a finished form, that is, with the smooth journal surfaces already furnished. The interference fit between the stack of laminations and the shaft attaches the parts together for rotation as a single unit. Finally, the outer periphery of the core is machined in an attempt to obtain a cylindrical surface concentric with the shaft.

Although this technique is theoretically simple to follow, it does not always produce a satisfactory rotor and shaft assembly having the desired characteristics previously outlined. For instance, the edge of the central shaft receiving opening in the individual laminations is slightly deformed as a result of, at least in part, the tearing or shearing action of the stamping operation. This, in turn, produces a somewhat irregular axially extending bore when the laminations are stacked. Consequently, after the annealing step in which the laminations change size, it is not uncommon for the laminations to force the shaft into a slightly bowed configuration. To straighten the shaft, it is normally over-stressed in the direction opposite to the bow by means of an arbor press. However, this not only adversely affects the type of securement between the core and shaft but in addition, after limited usage in the motor, the shaft tends to become bowed again, thereby causing misalignment of bearings and shaft to interfere with the rotation of the rotor assembly.

Another disadvantage of the foregoing procedure is the possible lack of concentricity of the squirrel-cage structure with the shaft as a result of the interference fit between the laminations and the shaft. Moreover, to obtain a good interference fit, the joining parts must be held within extremely small tolerances, an expensive procedure. Further, in the final operation where the outer diameter of the core is machined or otherwise fashioned into a cylindrical surface concentric with the shaft, the high finish of the shaft journal surfaces may be adversely affected, requiring a subsequent operation to polish the journal surfaces.

It will be appreciated that the foregoing disadvantages add to the over-all cost of mass producing the motor and are limiting factors in the resulting quality of the motors.

Another problem in the fabrication of rotor assemblies is the difficulty encountered in satisfactorily mounting thrust bearings on the shaft adjacent the rotor core for properly limiting the axial movement of the rotor assembly during rotation.

Consequently, it is an object of the present invention to provide an improved economically practical method, suitable for use in the mass production manufacture of rotor assemblies.

A still further object of this invention is the provision of an improved method of assembling laminated rotor core and shaft members which overcomes the aforementioned deficiencies.

It is another object of the invention to provide an improved method of rotor and thrust member fabrication which insures a minimum of variation in quality between mass produced laminated rotor assemblies.

Yet another object of the present invention is to provide an improved rotor assembly capable of being mass produced by low cost manufacturing processes.

In carrying out the objects of my invention in one form, I provide an improved method of fabricating a rotor assembly formed with a laminated core having a cast squirrel-cage winding, at least one thrust transmitting member, and a shaft including smooth journal surfaces adapted to rotate within suitable bearings. I initially apply adhesive thermoresponsive material, such as thermosetting epoxy resin, in an unhardened layer or film of preselected thickness onto the shaft and thereafter arrange the shaft in a non-horizontal position on a locating fixture, with the thrust member disposed on the shaft in the desired location. I then slip the core in a pre-heated condition, that is, preferably heated throughout above the temperature of the shaft and at which the adhesive film becomes even more fluid but below the melting point of the cast winding, over the shaft until it abuts against the thrust member and surrounds the film of adhesive material. The bore of the core in its unheated state has a loose fit relative to the outer surface of the shaft, the bore being expanded when the core is pre-heated. The latent heat of the core is transferred to the shaft through the film, causing it to become more fluid. As the core cools, part of the heat is absorbed by the adhesive material to harden or cure it while the bore of the core concurrently decreases in size until an intimate engagement or an interference fit is provided between the core and hardened film or layer, with the excess material being squeezed out of the bore and transferred into the bore of the thrust member. When the adhesive material hardens, the core and thrust member are secured to the shaft in a predetermined manner.

In addition, the process permits the utilization of an initially finished core and shaft, without either part being adversely affected by the individual steps when subsequently uniting the parts. Among other things, the improved rotor assembly provided by my invention includes true concentricity of the core periphery and of the cast winding with the shaft, and in spite of the utilization of low cost equipment, I provide a minimum of variation in quality between the rotor assemblies when manufactured in mass production quantities.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIGURE 1 is a side elevational view of an electric motor, the view being partially broken away and partially in section, to illustrate the operative position therein of a rotor assembly fabricated in accordance with the preferred embodiment of my invention;

FIGURE 2 is a side elevational view, partly in section, showing one manner of applying an adhesive insulating material to a rotor shaft at a predetermined location;

FIGURE 3 is a side elevational view in section illustrating the assembly of a pre-heated laminated rotor core and a thrust transmitting member with the shaft vertically arranged in a locating fixture;

FIGURE 4 is a view, partly in section, of a portion of the assembled core and shaft to illustrate the manner in which the adhesive insulating material permanently secures the parts together;

FIGURE 5 is a view similar to that shown in FIGURE 3, illustrating a preliminary step in adding a second thrust member to the core and shaft assembly; and FIGURE 6 is a side elevational view in section, showing the core and shaft in a reversed position in the fixture from that of FIGURES 3 and 5, with the second thrust member being secured to the shaft in the desired position.

Referring now to the drawing in more detail, and specifically to FIGURE 1, for purposes of explanation, I have illustrated the preferred embodiment of my invention being employed in the fabrication of a rotor assembly 11 for use in a small horsepower motor 12 of the well known single shaft output single phase induction type. In the exemplification, the rotor assembly includes a core 13 formed of a plurality of superposed laminations 14 having a cylindrical outer peripheral surface 15 and a conventional squirrel-cage type winding 16. Core 13 is fixedly secured to a shaft 18 furnished with an output end 19 conventionally undercut to receive ta pulley or other intermediate driving member (not shown). The preferred means for securing core 13 to shaft 18 in a manner to be described hereinafter takes the form of a hardened layer 20 of thermoresponsive adhesive insulating material, such as thixotropic Novalac thermosetting epoxy resin, commercially available from Dow Chemical Co., Midland, Mich. On either side of the core, shaft 18 is provided with identical thrust transmitting members 21 (only one being illustrated in FIGURE 1) which rotate with the shaft as a unit. Further structural details and features of the rotor assembly under consideration will be set out below during the explanation of the preferred manner in which rotor assembly 11 may be fabricated.

As to the other components of illustrated motor 12, it includes a stator 22 conventionally formed with a laminated core having a rotor receiving bore 23 and excitation windings 24. A motor housing 25, comprising a pair of end shields 26 and 27 and a central shell 28, surrounds and supports the stator in the customary fashion. Rotor shaft 18 is rotatably supported on each side of core 13, axially beyond thrust transmitting members 21, by a sleeve type bearing 29 which is fixedly connected to the respective end shields 26 and 27. The end of each bearing projecting toward the interior of the motor, is furnished with a stationary thrust receiving surface 30 provided perpendicular to the axis of rotation of rotor assembly 11 and cooperates with thrust transmitting member 21 to limit axial movement or end play of rotor assembly 11. For simplicity of illustration, only one end of the rotor shaft 18 and associated supporting means has been shown in FIGURE 1, but the other end, that is output end 19, may be similarly journaled, with the exception that output end 19 extends outwardly beyond end shield 26.

The preferred manner in which I fabricate rotor assembly 11 is shown in FIGURES 2–5 inclusive. Turning to FIGURE 2, I have illustrated one way layer 20 may be provided on shaft 18. In the present exemplification, the shaft is provided in its final form, including a pair of separate smoothly finished surfaces 32 and 33 adapted to be journaled by bearings 29 in the assembled motor of FIGURE 1. The formation of layer 20 may readily be accomplished by applying the adhesive material in an unhardened state, preferably of a substantially thixotropic paste like consistency to form an unhardened somewhat fluid film, identified at 20a, of a predetermined generally uniform thickness and length to be described hereinafter, onto the outer surface of the shaft at the desired location 34, intermediate surfaces 32 and 33.

The equipment for applying film 20a comprises a stationary fixture having spaced apart upright brackets 35 and 36 with suitable V-shaped grooves 37 and 38 respectively provided for rotatably supporting shaft 18 axially beyond the finished surfaces 32 and 33 so that the smooth finish of the surfaces will not be adversely affected during this operation. It should be noted that groove 38 terminates in a wall 39 which functions to arrange the shaft in a pre-selected position on the fixture. The unhardened adhesive material to be applied, designated at 20b, is contained in a rectangular receptacle 40, open at the top. Receptacle 40 supports a rotatable drum type applicator 41 arranged to have the bottom part (as seen in FIGURE 2) of its outer surface 42, which may include a cylindrical absorbent felt pad, immersed in the unhardened material 20b. Above receptacle 40, the outer surface 42 of the applicator is in rolling engagement with shaft surface 34. Applicator 41 may be driven by any suitable means and has its shaft 43 connected to a clutch mechanism 44 which in turn may be in driven relation with an electric motor (not illustrated) having the customary speed regulating means. Thus, it will be recognized from FIGURE 2 that the exact size of film 20a, both as to thickness and length, may be regulated by the width of applicator 41 and the extent of the rolling engagement between it and the shaft.

After the shaft 18 has been furnished with film 20a, it is removed from grooves 37 and 38 and transferred to a locating fixture, such as that shown in FIGURE 3 and identified by numeral 46, for assembling shaft 18 and core 13. During this transfer, film 20a air dries to a tack-free condition. The illustrated locating fixture 46 of FIGURES 3, 5, and 6, includes a stationary vertically disposed hollow tubular housing 47 provided with a bushing 48 at its upper end. Bushing 48 has a flanged section 49 projecting above bore 50 of housing 47 and is formed with a flat horizontal end surface 51 which is perpendicular to bore 52 of the bushing, bores 50 and 52 being in alignment and adapted to accommodate shaft end 19. An adjustable pin 55, axially movable in housing bore 50, is employed to determine the total vertical distance that the shaft projects into bores 50 and 52.

As previously noted, the rotor assembly 11 by way of illustration includes a core 13 having a squirrel-cage winding 16, shaft 18, and a pair of thrust transmitting members 21. Consequently, I utilize fixture 46 for prepositioning core 13, shaft 18, and one of the thrust members 21 relative to each other. The illustrated thrust member comprises a hub section 57 and a radially extending annular section 58, the latter section being provided with a flat thrust transmitting surface 59 on its end face. Member 21 is furnished with a bore 60, preferably tapering slightly outwardly to the extremity of hub section 47 from portion 61 of the bore disposed adjacent surface 59. Preferably portion 61 has a loose or clearance fit with the periphery of shaft 18 located next to journal surface 32. By loose fit is meant a fit which provides a large allowance between the outer diameter of shaft 18 and the inner diameter of portion 61 of the bore, requiring no close tolerances and giving considerable freedom of assembly for purposes which will become more apparent as the description proceeds.

Turning now to core 13 of the exemplification and its condition preparatory to its assembly with shaft 18, as shown in FIGURE 3, the core is formed with a central bore 63 extending entirely through the core. The bore preferably has a loose fit, under normal ambient temperature conditions (e.g., room temperature), with the outer surface of shaft section 34. The core may be made by stacking the desired number of laminations 14 and conventionally casting the squirrel-cage winding 16. That is to say, the conductors 64 and end rings 65, which compose winding 16, may be provided by a conventional die-casting operation. Each end ring may be furnished with a plurality of integral fan blades 66, if desired. Core 13 is cooled to set the cast metal and peripheral surface 15 of the core may be turned down or machined, as by grinding, to an accurate dimension, thus removing flashings or other excrescences created by the casting process, and producing a surface in true concentricity with bore 63 and conductors 64 of winding 16. This machining operation, due to my invention, is permitted to be performed on the core 13 at this stage of the procedure where it is easily accomplished without adversely affecting the high finish of shaft surfaces 32 and 33. The core may be annealed or heat-treated at this point in the well known and common fashion.

In accordance with the preferred form of my invention, when assembling core 13 and shaft 18 together on fixture 46, shaft 18 is at ambient or room temperature while core 13 is preferably pre-heated above the temperature at which the unhardened adhesive film 20a becomes even more fluid, but below the temperature at which the cast winding 16 will melt. Due to its pre-heated condition, core 13 will have an expanded bore 63, preferably of sufficient diameter that it has a loose fit with the outer surface of film 20a to facilitate assembly and permit slight relative movement between core 13 and shaft 18. For example, in actual practice, when constructing a rotor assembly incorporating a shaft having a nominal diameter of 0.5 inch, I apply a film in the neighborhood of 1½ mils in thickness on the shaft. The bore 63 of core 13 accordingly has a nominal dimension of 0.502 inch, under ambient temperature conditions. This will increase to a maximum size of 0.504 inch when the core is pre-heated to the desired temperature, e.g., above 300° C., since as a rule, the bore of magnetic laminations expands about one (1) mil per inch per 100° C. Thus, in the example, the diameter or combined transverse dimension of the shaft and applied film is approximately 0.503 inch, and as such, would define a slip or loose fit with the bore of the pre-heated core (diameter of 0.504 inch), but would provide an unstressed interferring or interlocking fit of about one (1) mil once the core has cooled to ambient, returning the size of the bore to its original 0.502 inch nominal dimension.

Further, with winding 16 composed of aluminum, which has a melting temperature in the range of 750° C. to 800° C., the pre-heat temperature should be below 700° C. The pre-heated condition of the core may be readily accomplished by any suitable means (not shown). For instance the unheated core may be placed in a standard bake-out oven maintained at a temperature of approximately 450° C. With the core of the exemplification, best results have been obtained by keeping the core in the oven until the whole core has been heated to a temperature in the order of 350° C. The core will thus include sufficient latent heat to expand the bore the requisite amount as well as for carrying out its original functions to be set out hereinafter. If the core has been annealed, normally heat-treated at an approximate temperature of 550° C., the above pre-heat step would not be necessary, since the core could advantageously be taken directly from the anneal oven and quenched to the desired pre-heat temperature; e.g., 350° C. of the example.

With shaft 18 disposed vertically on fixture 46 in the manner shown in FIGURE 3, that is, with pin 55 engaging the output end 19 of the shaft to position journal surface 32 properly within bushing bore 52 (adjacent flat surface 51 of the bushing) and with thrust surface 59 of member 21 resting on bushing surface 51, the pre-heated core 13 is slipped over the upright end of the shaft until it comes into contact with hub section 57 of thrust member 21. Heat from the pre-heated core 13 will be transferred to the cooler shaft through adhesive film 20a which absorbs part of the heat, initially becoming fluid for a short period of time just prior to the onset of gelatin. Since the adhesive material is preferably of the thixotropic type, it does not run out of the bore in any appreciable quantities even after it becomes more fluid due to the initial absorption of heat. Further absorption of heat from core 13 by film 20a causes the material to "set up" or reach its gelatin state and to harden, while the removal of the heat from the core concurrently reduces the diameter of bore 63. In actual practice, I have observed that film 20a serves to center or radially align shaft 18 relative to core 13 and its finished periphery 15. This may be due to the fluid pressure of adhesive film 20a as it changes form. In any case, the latent heat of the core provides a cure of film 20a to produce a sufficiently hardened layer, denoted by numeral 20, for securing the core to the shaft in the desired concentric relation. This may be achieved within ten (10) minutes when using the adhesive material of the example. The core, as it cools, is in effect shrunk fit onto the hardening adhesive film such that it ultimately has an intimate, interlocking fit with the hardened layer 20, as shown most clearly by FIGURE 4. It will be seen that the reduction of bore size causes the adhesive material to be squeezed radially outwardly, penetrating between adjacent laminations 14 for a short distance; e.g., ³⁄₃₂ of an inch in the exemplification. Thus, the space between the shaft and core bore is insured of being completely filled with adhesive material to effect a firm and intimate engagement between the two parts. The adhesive material also provides a supplemental means for holding the portion of the laminations adjacent the bore firmly together.

In addition, this squeezing action and the non-horizontal position of the shaft together cause the excess unhardened adhesive material within the bore 63 to flow downwardly into the tapered bore of thrust member 21. Due to the loose adjustable fit of member 21 on shaft 18, member 21 will be forced into the desired relation with the shaft; i.e. face 59 perpendicular to the shaft axis, and fixedly secured to the shaft in that position as the material within its tapered bore (denoted by numeral 20c in FIGURE 5) hardens. Thus, for the core of the exemplification, assuming it has an axial length of 1½ inches applicator 41 should provide a film of approximately 1¾ inches in length. It will be appreciated from the above description that fixture bushing 48, not only functions to protect the smooth journal surface 32 of the shaft during the assembly process as well as prepositioning the shaft and core, but its flat surface 51 corresponds to the thrust receiving surface 30 of the bearing in the finally assembled motor 12, thereby properly locating thrust surface 59 relative to the axis of the shaft.

After the adhesive material has hardened sufficiently to hold the parts in their relative final positions on shaft 18, the second thrust member 21a may be attached to the core adjacent journal surface 33. FIGURES 5 and 6 illustrate one means for achieving this end. For instance, a predetermined amount of adhesive material 70, such as the Novalac epoxy, may be applied in a bead form adjacent the upper end of the core (as illustrated in FIGURE 5) by any suitable means, such as nozzle assembly 71. With the annular bead 70 in its unhardened state, the shaft 18 and attached core 13 and thrust member 21 are removed as a unit and inverted on fixture 46, with the second thrust member 21a arranged on bushing 48 for properly locating the thrust member transmitting surface 59a relative to the axis of the shaft while bead 70 hardens or cures to secure the thrust member to the shaft.

From the foregoing, it will be appreciated, that the method of my invention permits the use of a shaft initially provided with finished smooth journal surfaces, if such is desired, without the finish being adversely affected by subsequent operations. Moreover, there is avoided the necessity of cleaning the outer surface of the rotor assembly as the last operation, which in turn, could very possibly adversely affect the quality of the journal surfaces of the shaft. Furthermore, there is assured an arrangement in which the core will be secured to the shaft, with the outer peripheral surface and the squirrel-cage structure of the core being in true concentricity with the shaft. Another feature resides in the fact that the shaft of the rotor assembly will not be bowed or otherwise distorted during the rotor assembly fabrication procedure, and requires no rework after the core and shaft have been assembled. In addition, the securement effected between the core and the shaft includes a maximum adhesive contact, insuring a superior connection between the component parts. My process may also advantageously be employed to attach thrust members to the shaft in the proper relation with a minimum of cost. Finally, as a practical matter, my method employs low cost equipment, yet produces improved rotor assemblies having a minimum of variation in quality between assemblies when manufactured in mass production quantities.

It should be apparent to those skilled in the art, while I have shown and described what at present is considered to be the preferred embodiment of my invention in accordance with the Patent Statutes, changes may be made without actually departing from the true spirit and scope of this invention, and I therefore intend to cover in the following claims all such equivalent variations as fall within the invention.

What I claim as new and desire to secure by Letters Patent of the United States is:

1. A method of fabricating a rotor assembly comprising the steps: applying a layer of adhesive thermosetting resin material in an unhardened state onto a shaft at a predetermined position on the shaft; assembling the shaft having the layer thereon with a pre-heated and expanded laminated rotor core with both being positioned generally vertically and relatively radially movable to one another, said core comprising a plurality of secured together superposed laminations including a shaft receiving bore extending axially therethrough, said core having a loose fit relative to the shaft under ambient conditions and being positioned over the unhardened layer, said pre-heated core being heated above the temperature of the shaft and the temperature at which the adhesive material becomes fluid thereby further enlarging the bore of the core to a diameter dimensionally greater than the combined transverse dimension of the unhardened material and shaft; reducing the size of the bore by cooling the core and changing the form of the unhardened adhesive material by the latent heat of the core, with the unhardened adhesive material initially becoming fluid and tending to center the shaft relative to the core, and with a portion of the adhesive material being squeezed radially outward to penetrate slightly between next adjacent laminations next to the bore; and curing the material by using the latent heat of the core whereby the shaft and core are secured together in a predetermined unitary relationship by the cured thermosetting material.

2. Method of claim 1 in which the pre-heated and expanded rotor core includes a cast squirrel-cage winding and the core is pre-heated above the temperature at which the adhesive material becomes fluid but below the melting temperature of the cast winding.

3. A method of fabricating a rotor assembly comprising the steps: applying a layer of adhesive thermosetting epoxy resin material in an unhardened state onto a shaft at a predetermined position on the shaft; assembling the shaft having said layer thereon with a pre-heated and expanded laminated rotor core; both being positioned generally vertically and relatively radially movable to one another, and at least one thrust transmitting member disposed adjacent the core, said core comprising a plurality of secured together superposed laminations including a shaft receiving bore extending axially therethrough, said core and thrust member each having a loose fit relative to the shaft under ambient conditions and being positioned over the unhardened layer, said pre-heated core being heated above the temperature of the shaft and the temperature at which the adhesive material becomes fluid thereby further enlarging the bore of the core to a diameter dimensionally greater than the combined transverse dimension of the unhardened material and shaft; reducing the size of the bore by cooling the core and changing the form of the unhardened adhesive material by the latent heat of the core, with the unhardened adhesive material initially becoming fluid and tending to center the shaft relative to the core, and with a portion of the adhesive material being squeezed radially outward to penetrate slightly between next adjacent laminations next to the bore; and curing the material by using the latent heat of the core whereby the shaft, thrust member, and core are secured together in a predetermined unitary relationship by the cured thermosetting material.

References Cited

UNITED STATES PATENTS

| | | | |
|---|---|---|---|
| 2,224,145 | 12/1940 | Dugan et al. | 29—447 |
| 2,232,812 | 2/1941 | Studer. | |
| 2,519,895 | 8/1950 | Edwards et al. | |
| 2,528,154 | 10/1950 | Ludwig et al. | |
| 2,541,047 | 2/1951 | Frisbie et al. | |
| 2,767,339 | 10/1956 | Halfield. | |
| 2,795,715 | 6/1957 | Gilchrist. | |
| 2,818,517 | 1/1958 | Loosjes. | |
| 3,018,541 | 1/1962 | Hunt et al. | 29—447 X |
| 3,045,133 | 7/1962 | Aske | 310—43 |
| 3,141,233 | 7/1964 | Schneider | 29—155.53 |
| 3,159,402 | 12/1964 | Nichols | 156—86 X |
| 3,173,194 | 3/1965 | Applegate | 310—43 X |
| 3,229,134 | 1/1966 | Rakula | 29—155.5 |

JOHN F. CAMPBELL, *Primary Examiner.*

R. W. CHURCH, *Assistant Examiner.*